United States Patent
Crafton

[15] 3,654,604
[45] Apr. 4, 1972

[54] SECURE COMMUNICATIONS CONTROL SYSTEM

[72] Inventor: Paul A. Crafton, Potomac, Md.

[73] Assignee: Constellation Science and Technology Corporation, Oxon Hill, Md.

[22] Filed: Jan. 5, 1970

[21] Appl. No.: 726

[52] U.S. Cl. ......................... 340/147 R, 178/23, 340/146.1, 340/146.2, 340/149
[51] Int. Cl. ................. G06f 11/00, G08b 29/00, H04l 15/24
[58] Field of Search .................. 340/147, 149, 146.1, 146.2; 178/23.1, 69

[56] References Cited

UNITED STATES PATENTS

| | | |
|---|---|---|
| 2,956,124 | 10/1960 | Hagelbarger..........................178/23 X |
| 3,402,389 | 9/1968 | Koontz................................340/146.1 |
| 3,418,630 | 12/1968 | Vanduuren..........................340/146.1 |

*Primary Examiner*—Donald J. Yusko
*Attorney*—Sughrue, Rothwell, Mion, Zinn & Macpeak

[57] ABSTRACT

A system for generating secure command signals at a remote station, such as a branch bank, under the control of a central station, such as a main bank. Random words are independently generated at each station and transmitted to the other station. Both random words are compared at each station and the comparisons are ANDed at the remote station. Exact coincidence produces the command signal.

10 Claims, 3 Drawing Figures

SECURE COMMUNICATIONS CONTROL SYSTEM

BACKGROUND OF THE INVENTION

This invention relates to an electronic system for generating secure command signals at a remote station under the control of a central station.

In many situations where an unattended remote station is controlled by a manned central station coupled to it through a communications link, it is imperative that the system be secure against unauthorized persons exercising control over the remote station, such as by gaining access to or tapping into the communications link. A specific example focuses on a recent development in the banking industry wherein unattended, remotely located branch stations may dispense cash to verified depositors in the form of withdrawals or loans under the control of a main or central bank. In such a system a depositor or customer establishes his identity at the branch station through a credit card verifier or the like, and communicates the amount of money desired to the central bank. If his balance or credit is sufficient an attendant at the central bank then transmits a command signal to the branch station which initiates the operation of the cash dispensing mechanism.

In a system of this type it is obvious that absolute security is essential, since otherwise a skillful criminal could tap into the communications link, learn the command signal, and rapidly empty each branch station of its cash stock by simply duplicating the signal.

Most of the prior art solutions to this problem have taken the approach of either coding the command signal and/or camouflaging it, such as by mixing or interleaving it with an accompanying data or information signal. The drawback to these approaches is that both the code and the camouflaging pattern are always fixed and invariant, and they may therefore be "broken" or compromised by repeated monitoring and comparison.

SUMMARY OF THE INVENTION

This invention effectively overcomes the disadvantages and dangers of the prior art systems noted above by providing an absolutely secure command signalling system for a central station-remote station environment that is positively incapable of being tampered with and being used in an unauthorized manner.

Briefly, this system initially involves the separate and independent generation of equal length random words at both the central and remote stations. The random word generated at the remote station is then transmitted to the central station where it is compared with the random word generated there. The results of the comparison are then transmitted to the remote station along with the random word generated at the central station. A second comparison of the two random words takes place at the remote station, the results of both comparisons are themselves ANDed or compared, and, if they correspond or agree, the final command signal is generated.

The command signal itself is not transmitted from the central to the remote station, but rather a signal combination is transmitted which, when properly processed at the remote station, enables the local generation of the command signal. Since the signal combination is completely random in nature and differs each time the system is used, there is no way in which someone with criminal intent could exercise any control over the remote station, even after gaining access to the communications link and monitoring a series of signal transmissions.

This invention further contemplates the provision of matrices at each station to interconnect the bits of the random words for comparison in a prescribed but scrambled manner. This is simply an additional precaution whereby the matrices may be changed whenever an employee having knowledge of the system leaves, and corresponds to changing the settings of a combination lock under similar circumstances.

It is also contemplated that the transmission from the central station to the remote station may contain message or information bits interleaved with the random word and comparison result bits. These information bits may, for example, either specify or verify the amount of cash to be dispensed to the customer in the case of a branch banking system.

BRIEF DESCRIPTION OF THE DRAWINGS

The following detailed description of the invention is to be read in conjunction with the accompanying drawings in which.

DESCRIPTION OF THE PREFERRED EMBODIMENT

Figure 1:
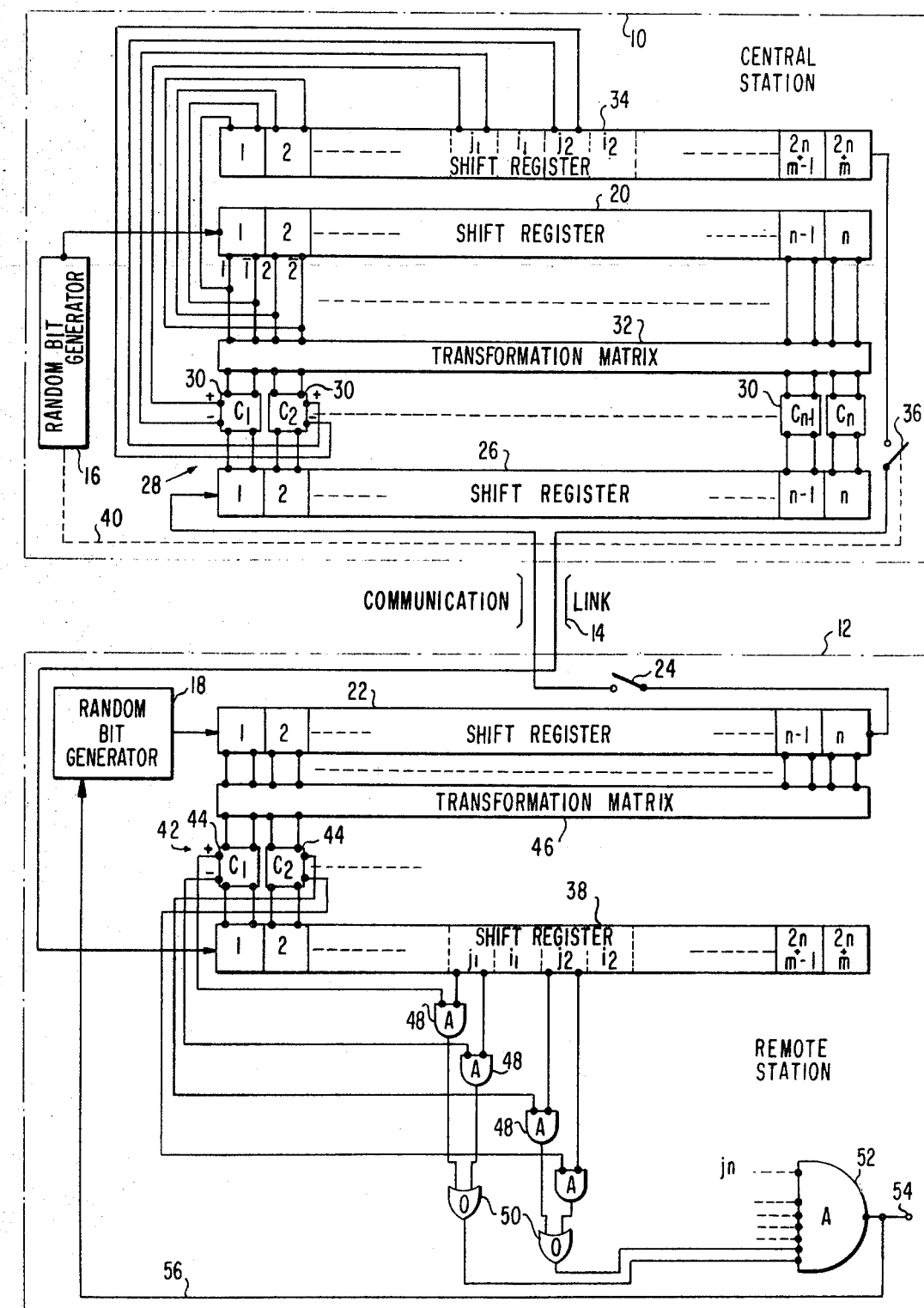
FIG. 1 shows a schematic block diagram of a secure command signalling system constructed in accordance with the teachings of this invention.

FIG. 1 shows a central station 10 connected to one of a plurality of remote stations 12 by a communications link 14. The communications link may take any convenient form well known in the art, such as a direct wire link, a microwave link, etc., and the signalling may be done by pulse frequency modulation, amplitude modulation, PSK, etc., not essential to the invention. The link would, of course, include appropriate transmitting and receiving circuits, modulators and demodulators, etc., the details of which have been omitted for the sake of simplicity. In describing the operation of the system it will be assumed that random bit generators 16 and 18 in the central and remote stations, respectively, have previously been actuated by means, not shown, to load their respective shift registers 20 and 22 with separate, independently generated n bit random words.

To initiate the generation of a command signal the operator or customer at the remote station closes switch 24 which transmits the contents of register 22, in a nondestructive read-out fashion, over communications link 14 to n stage shift register 26 at the central station. The random words in registers 20 and 26 are then compared, bit by bit, by a comparator 28 having $n$ individual stages 30. One of the registers 20 or 26 may be connected to the comparator 28 through a transformation matrix 32 which scrambles or mixes the order of the register stages in a manner to be described later. The outputs from the comparator stages are read into the $j$ stages of shift register 34. The random word in register 20 is also read into the correspondingly numbered stages of register 34. The latter has 2 n+m stages to accommodate the contents of both register 20 and comparator 28, and in addition, an $m$ bit message loaded into the $i$ stages of register 34 by separate means, not shown. The bits in the numbered stages, the comparator bits in the $j$ stages and the message bits in the $i$ stages may all be mixed together or interleaved, if desired, to provide a further measure of security. In the arrangement shown in FIG. 1, for example, the comparator bits and the message bits have been alternately interleaved.

At this point the operator or controller at the central station must determine whether or not the requested command signal is to be given, such as by verifying the requesting party's identification and credit rating in the branch bank situation. Assuming the decision is positive, the controller depresses switch 36, which transmits the contents of register 34 over the communications link 14 to load equal length shift register 38 at the remote station. The closure of switch 36 also actuates random bit generator 16, as indicated by the broken line 40, causing the generation of a new random word and the loading of same into shift register 20 in preparation for a future cycle.

The $n$ numbered stages of register 38 are coupled to a comparator 42 made up of $n$ individual stages 44. The comparator 42 now compares, bit by bit, the contents of register 22 with the contents of the $n$ numbered stages of register 38. Register 22 is coupled to the comparator through a transformation matrix 46 wired in an identical manner to transformation matrix 42 at the central station. This second comparison at the remote station duplicates the first comparison performed earlier at the central station since register 22 was non-destructively read-out when its contents were transmitted to register 26, and the $n$ numbered stages of register 38 contain the random bit word originally fed into register 20 by generator 16.

The results of the second comparison, as represented by the outputs of comparator stages 44, are ANDed or compared with the results of the first comparison carried in the $j$ stages of register 38. This may be implemented by supplying the positive and negative, or 1 and 0, outputs from each comparator stage 44 and its corresponding $j$ stage in register 38 to separate AND gates 48, and then feeding the outputs from each AND gate pair to an OR gate 50. Thus, if a comparator stage and a corresponding $j$ stage have similar states or contents, both of the monitoring AND gates 48 will have raised outputs, as will the associated OR gate 50. A final AND gate 52 monitors the OR gate outputs, and if all of them are raised indicating full coincidence between the two comparisons performed separately at the central and remote stations, its output 54 assumes a raised signal level to provide the desired command signal. At the same time generator 18 is actuated over line 56 by the readout of AND gate 52 to generate a new random bit word and load same into register 22 in preparation for the next cycle of operation.

Once again, since the command signal is generated at the remote station rather than being transmitted thereto, and since the transmissions in both directions involve completely random words that differ for each operation, it would be impossible for an unauthorized person having access to the communications link to ever exercise any control over the system.

Figure 2:
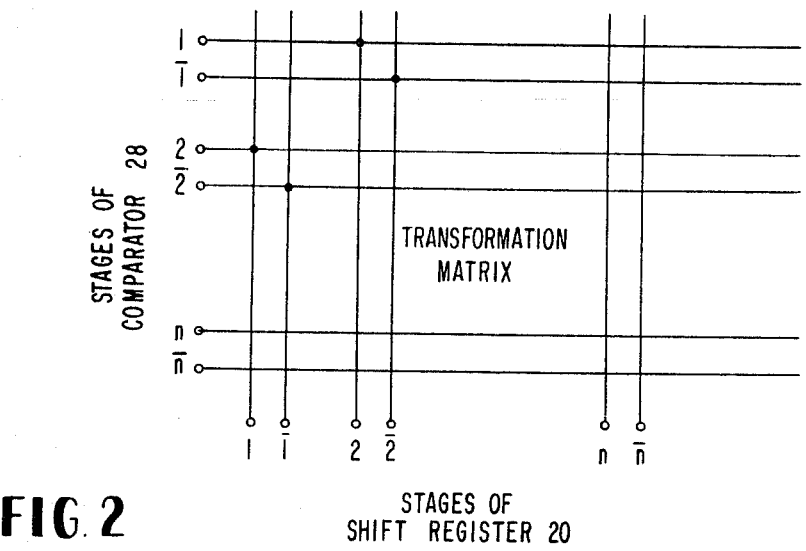
FIG. 2 shows a portion of a transformation matrix.

FIG. 2 shows a portion of an exemplary form of transformation matrix suitable for use with the invention. It may be a simple row and column matrix with plug board connections at desired intersections, as shown, or it may take any other suitable form well known in the art. In FIG. 2, for example, stage $C_1$ of comparator 28 is connected to stage 2 of register 20, and stage $C_2$ of the comparator is connected to register stage 1. An easily changeable form of connections should preferably be employed to facilitate changing the settings of the matrices whenever an employee leaves.

Figure 3:
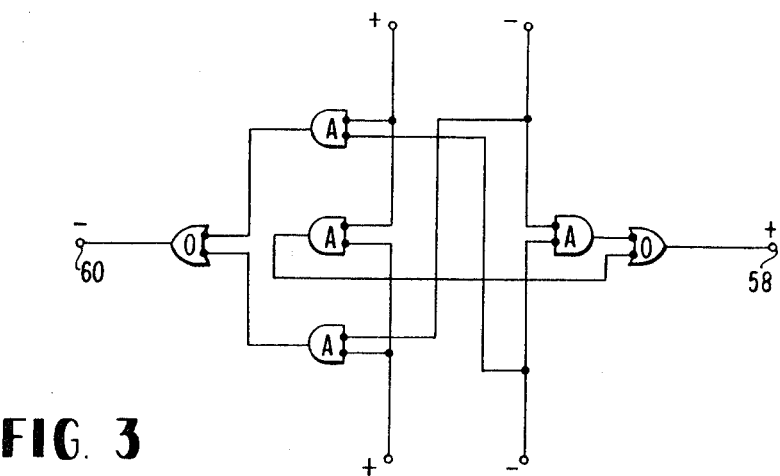
FIG. 3 shows a logic diagram of a suitable comparator stage.

FIG. 3 shows an exemplary form of one of the comparator stages 30 or 44. It consists of AND, OR logic arranged so that if the inputs applied to the top and bottom terminal pairs from the register stages are the same, as shown, the positive output terminal 58 is raised while the negative output terminal 60 is lowered. The converse is true, of course, if the inputs are opposite to teach other, such as plus-minus and minus-plus.

As an alternative to the operation described above, random bit generator 18 at the remote station may be actuated by the closure of switch 24 at the initiation of the operating cycle. In this case, switch 24 would be held down or latched long enough for register 22 to become fully loaded and its contents transmitted to the central station.

An alternate to the use of the random bit generators 16 and 18 is to employ the shift registers 20 and 22 as part of pseudorandom sequence generators. This is accomplished by the addition of a multi-input modulo-2 adder to each register. The inputs to each adder are taken from selected stages of the shift register, and the adder output is returned to the shift register input. This configuration is known in the art as a sequence generator and depending upon the configuration of taps used will generate sequences exhibiting random properties.

In the foregoing description a number of structural elements which would be included in a complete system have been omitted in the interest of simplicity since such elements are well known in the art. Exemplary of these are clocking means to control the various register stepping, comparing, and gating functions, transmitting and receiving circuitry, as mentioned earlier, power supplies, switches for initially or independently actuating the random bit generators, means for loading information into and extracting it from the $i$ stages of registers 34 and 38, etc. In addition, the details of the circuitry shown have been omitted since random bit generators, shift registers, logic gates, etc., are also well known in the art and form no part of the present invention.

I claim:

1. A method of generating a secure command signal for a remote station coupled by a communications link to a central station, comprising the ordered steps of:
    a. generating a first word at the remote station,
    b. transmitting the first word to the central station,
    c. generating a second word at the central station,
    d. deriving a third word at the central station from the first and second words,
    e. transmitting the second and third words to the remote station,
    f. deriving a fourth word at the remote station from the first and second words, and
    g. generating a command signal at the remote station in response to a comparison between the third and fourth words.

2. A method as defined in claim 1 wherein the first and second words are random bit words.

3. A method as defined in claim 1 wherein the third and fourth words are derived by comparing the first and second words.

4. A method as defined in claim 2 wherein the third and fourth words are derived by comparing the first and second words.

5. A secure command signalling system for a remote station coupled by a communications link to a central station, comprising:
    a. means at the remote station for generating a first word and transmitting same to the central station,
    b. means at the central station for:
        1. generating a second word,
        2. deriving a third word from the first and second words, and
        3. transmitting the second and third words to the remote station, and
    c. means at the remote station for:
        1. deriving a fourth word from the first and second words, and
        2. producing a command signal in response to a comparison between the third and fourth words.

6. A secure command signalling system as defined in claim 5 wherein the means for generating the first and second words are random bit generators.

7. A secure command signally system as defined in claim 5 wherein the means for deriving the third and fourth words are comparators.

8. A secure command signalling system as defined in claim 6 wherein the means for deriving the third and fourth words are comparators.

9. A secure command signalling system as defined in claim 7 further comprising a transformation matrix at each station for connecting one of the first or second words to the comparator.

10. A secure command signalling system as defined in claim 5 further comprising means for interleaving message bits in the transmission of the second and third words to the remote station.

* * * * *